United States Patent

[11] 3,590,232

| [72] | Inventor | Henry B. W. Sadowski |
| | | Plainview, N.Y. |
| [21] | Appl. No. | 716,591 |
| [22] | Filed | Mar. 27, 1968 |
| [45] | Patented | June 29, 1971 |
| [73] | Assignee | Radioptics, Inc. |
| | | Plainview, N.Y. |

[54] ANNULAR ILLUMINATOR FOR DENTAL TOOLS OR THE LIKE
10 Claims, 10 Drawing Figs.

[52] U.S. Cl. .................................................. 240/2,
32/27, 128/303.1, 240/6.46, 350/96
[51] Int. Cl. ..................................................... F21v 33/00,
A61c 3/00
[50] Field of Search .......................................... 240/1, 1 E,
1 L, 2.13, 2.14, , 2.17, 2.18, 2 MT, 2 I, 6.46; 128/6,
11, 16, 23, 303.1; 32/27; 350/96

[56] References Cited
UNITED STATES PATENTS

| 3,068,739 | 12/1962 | Hicks, Jr. et al. | 240/1 EL UX |
| 3,146,775 | 9/1964 | Moore et al. | 128/6 |
| 3,261,349 | 7/1966 | Wallace | 128/6 |
| 3,278,738 | 10/1966 | Clark | 240/1 EL X |
| 3,299,884 | 1/1967 | Moore et al. | 128/23 |
| 3,327,712 | 6/1967 | Kaufman et al. | 350/96 X |
| 3,397,457 | 8/1968 | Gosselin | 350/96 UX |

Primary Examiner—Samuel S. Matthews
Assistant Examiner—Joseph F. Peters, Jr.
Attorney—Darby & Darby ABSTRACT: A fiber-optic apparatus including a long flexible fiber-optic light guide formed of a bundle of transparent fibers of glass or synthetic resin material. One end of the bundle of fibers is intensely illuminated by a projection lamp and suitable optics for concentrating light on the end of the bundle, and the other end of the bundle of fibers is spread and shaped into an annular configuration arranged so that the cones of light from the individual fibers overlap to provide substantially uniform illumination of an area about equal to or somewhat greater than the area within the annulus at a predetermined working distance from the ends of the fibers. A method of manufacturing the annular configuration includes shaping fibers on a mandrel, retaining them with rings and securing them with adhesive before serving the fibers at one ring to form the annular output end.

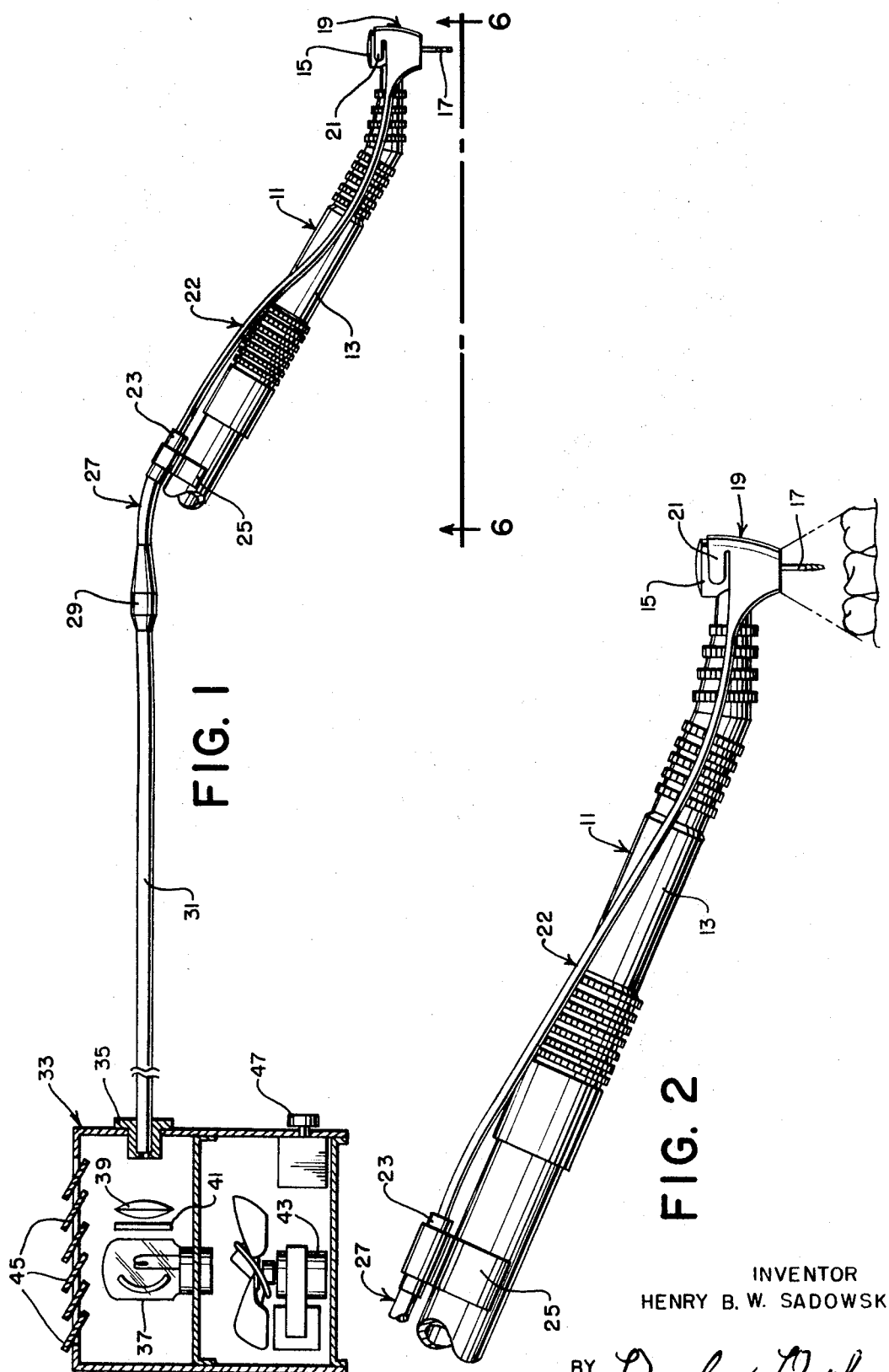

PATENTED JUN 29 1971 3,590,232

INVENTOR
HENRY B. W. SADOWSKI

BY Darby & Darby
ATTORNEYS

ANNULAR ILLUMINATOR FOR DENTAL TOOLS OR THE LIKE

The present invention is directed to the problem of obtaining intense, uniform, shadowless, cold light in a working area in an unilluminated cavity or other restricted space. One important application of the invention provides an illuminator attachable to a dental tool to provide illumination for a dentist working in an oral cavity.

A dentist would obviously prefer to work most efficiently in the oral cavity without the necessity of diverting his attention from his principal objective in order to keep his work area properly illuminated. In current practice illumination for the dentist working in the oral cavity is provided in the following manner:

1. an external source of light is directed into the oral cavity from a source outside the normal range of movement of the dentist;

2. a mirror held in one hand by the dentist is used to reflect light into the particular area where he is working;

3. the dentist must position himself, the mirror and the light source so that he can see the illuminated work area either directly or by reflection from the mirror and so that he can see the work area without obstructing with his head, body or hands the light entering the oral cavity from the source; it is virtually impossible to avoid shadows on the work area introduced by the drill, burr, arbor, handpiece or tool with which the dentist is working.

It is reasonably obvious that much of the obstruction of light could be avoided by placing one or more lamps closer to the dentist's work area, ideally such lamp or lamps should be within the patient's oral cavity. The practical difficulties with such an arrangement have never been overcome to the point where it has been placed in wide use. There are still difficulties with shadows in addition to which there is the difficulty of considerable heat being generated by the lamp and the lamp would either have to be independently supported or directed or alternatively placed on a tool with the disadvantage of making the tool bulky and possibly hot.

Some but not all of these problems may be alleviated by substitution of a fiber-optic light source for a lamp. However, this mere substitution fails to provide an acceptable arrangement on several counts. The light would still be required to be properly directed, such direction being appropriate to eliminate shadows and provide substantially uniform illumination in the work area. Attachment of a fiber-optic light source to the viewing mirror likewise does not provide an adequate solution since shadows introduced by the tool, drill or burr would still be difficult to avoid. Moreover, the dentist would be forced to manipulate two tools simultaneously as at present with the added disadvantage of having the fiber-optic bundle cable attached to the viewing mirror.

The present invention provides an illuminator which succeeds in eliminating most if not all of the problems described above. The work area is substantially uniformly illuminated virtually without the possibility of shadows. The light source is attached to and becomes virtually a part of the dentist's handpiece or tool yet the bulk and weight of the tool are not significantly increased. The lamp from which the fiber-optic bundle transmits the light may be substantially removed from the dentist's operating area.

In addition to providing the above-described advantages, it is an object of the present invention to provide an illuminator particularly adapted to be mounted on a hand-held tool so that the normal working area for the hand-held tool is uniformly and intensely illuminated, the illumination being directed to minimize interference with the illumination by any part of the tool or its accessories.

It is another object of the invention to provide such an illuminator wherein the light is transmitted and directed by optical fibers which terminate in an annulus surrounding the working end portion of the tool.

It is still another object of the present invention to provide such an illuminator in which the fiber configuration is designed to provide substantially uniform illumination over a work area located at the normal working distance from the tool.

Other objects and advantages of the present invention will be apparent from a consideration of the following description in conjunction with the appended drawings in which:

FIG. 1 is an elevational view partially in section showing an illuminator apparatus for use in conjunction with a dental drill;

FIG. 2 is an enlarged view of a dental drill and the terminal portion of the annular fiber-optic illuminator of FIG. 1;

Figure 3:
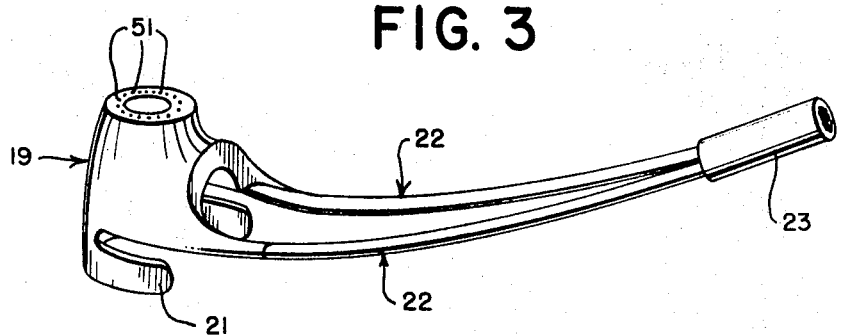
FIG. 3 is a perspective view of the terminal or head portion of the annular fiber optical illuminator of FIGS. 1 and 2 removed from the dentist's drill.

Referring to the drawings an air-driven dental handpiece 11 is illustrated as an example of a tool with which the annular illuminator of the present invention may be associated. The dental handpiece 11 has a handle 13 and a chuck portion 15 in which may be secured a drill 17 or other device such as a burr, grinding tool, brush, or the like.

The head 19 of the annular illuminator substantially surrounds chuck 15 and is secured thereto by suitable means such as spring clip 21. It is apparent that rather than spring clip 21, a more positive means of attachment may be employed such as a snap or threaded retaining ring or a collar grip with bolt or set screw locking. Formed integrally with the annular illuminator head 19 are a pair of fiber-optic light transmitters 22 which join at a transition section 23 to form a unitary fiber-optic light transmitter section 27. The fiber-optic transmitter 27 may be secured to the tool handle 13 by a spring clip 25 or other suitable means.

It may be desirable to terminate the fiber-optic light transmitter section 27 in a coupler 29 which may be of conventional design so that the head 19 of the annular illuminator and the adjacent sections of light transmitter may readily be uncoupled from the remainder of the apparatus; couplers may also provide efficient optical coupling between bundles of different size or acceptance angles. Transition section 23 may be combined in a single unit with coupler 29.

A further fiber-optic light transmitting section 31 is provided to complete the connection to the light source housing 33.

The total length of the fiber-optic light transmitter extending from the light source housing 33 to the annular illuminator head 19 may be on the order of 10 feet or more so that the light source housing 33 may be conveniently located well out of the operator's working area.

Light sources and housings designed to couple an intense light beam into a fiber-optic bundle are known in a number of varieties and thus this portion of the apparatus is not shown in detail in FIG. 1. However, a somewhat schematic illustration of the principal elements of such apparatus is shown.

The housing 33 is provided with a cylindrical fitting 35 to locate and secure the end of fiber-optic light transmitter section 31. A lamp 37 is located in the housing 33; the lamp 37 may be a high-intensity projector lamp of the type used in slide projectors or movie projectors.

Preferably a filter 41 is provided to filter out the infrared radiation from lamp 37 so that essentially "cold" light is transmitted. A lens system schematically illustrated as a converging or condensing lens 39 is provided to concentrate the output from lamp 37 on the end of the fiber-optic light transmitter section 31.

In accordance with usual practice a fan 43 is provided for forced air cooling of the lamp 37, and louvers 45 are provided in the housing 33 suitably arranged to facilitate cooling of the apparatus.

A control 47 for the lamp 37 is provided which is preferably of the variable-power type which employs a semiconductor circuit to permit variation of the power provided to lamp 37 and thus permitting variation of the intensity thereof.

Figure 4:
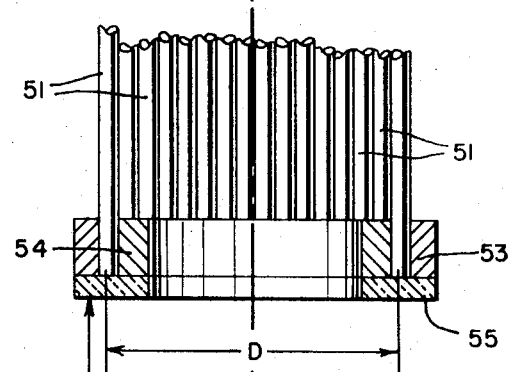
FIG. 4 is a vertical fragmentary sectional view of an annular illuminator structure.

FIGS. 3 and 4 show the detailed structure of the head 19 of the annular illuminator which is of great importance in the present invention.

A fiber-optic bundle has an inherent property of emitting from its end a beam which is generally not very divergent. For example, a typical fiber-optic bundle having a diameter of approximately one-fourth inch might typically emit a beam from the end thereof in which more than 90 percent of the light fell within a cone having a total angle of from 20° to 30°.

Furthermore, the intensity in the center of the beam from such a bundle would be quite high and it would fall off rapidly as one departs from the axis of the beam.

From the foregoing, it will be seen that the light beam from a simple fiber-optic bundle is inherently unsuited to illuminate a work area for a tool such as a dental drill.

The annular illuminator according to the present invention provides a modification of the typical fiber-optic bundle which is nearly ideally suited to illuminating the work area for a dental tool or the like.

As illustrated in FIGS. 3 and 4, each individual fiber of the fiber-optic bundles 22 is led to a position on an annulus surrounding the axis of the chuck 15 at which will be located the shaft of a drilling tool 17 or the like.

The dimensions of the annulus of the head 19 together with the characteristics of the fibers 51 are selected so that the illumination of the work area for the dental tool 11 is substantially uniform over a circle of appropriate diameter.

Furthermore, the distribution of the individual fibers 51 around an annulus in a substantially uniform manner virtually eliminates any shadow that would be created by drill 17 or the like.

In FIG. 4, it will be observed that the fibers 51 are supported between an internal ring 54 and an external ring 53. They are preferably retained in place by an epoxy adhesive. FIG. 4 shows an optional diffuser 55 covering the ends of the fibers 51. The purpose of such a diffuser is to broaden the beam emitted from each individual fiber in order to provide the desired uniform illumination of a circle positioned a distance S away from the illuminator head 19. The diffuser 55 will often be unnecessary as will be understood from the more detailed explanation hereinafter. Accordingly, the diffuser is omitted in the other Figures illustrating the apparatus.

Figure 5:
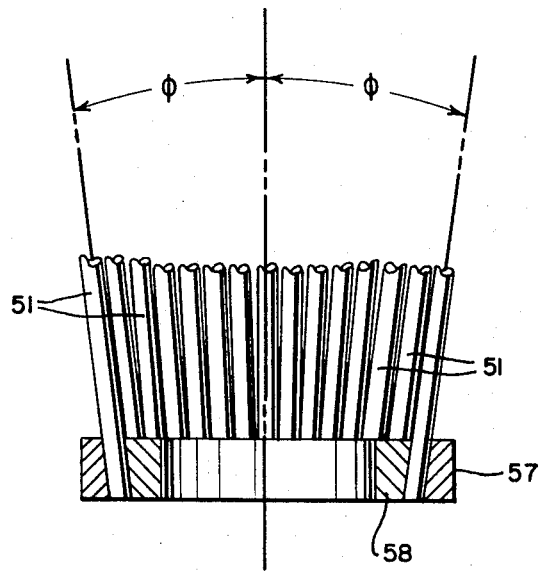
FIG. 5 is a vertical sectional view of an alternative annular illuminator structure.

An alternative form for the output end of fibers 51 is illustrated in FIG. 5. In FIG. 5 it will be noted that the fibers are arranged to approximate the shape of a truncated cone. The external ring 57 and the internal ring 58 have their surfaces adjacent the fibers 51 disposed at an angle Φ with respect to the axis of the rings. The alternative construction of FIG. 5 is useful in circumstances where the diameter of the annulus of fibers is required to be large in order to accommodate a portion of a tool such that the light pattern produced by the fibers would have a dark spot in the center if they were in parallel arrangement as illustrated in FIG. 4. The inwardly angled arrangement of FIG. 5 is designed to create sufficient overlap in the light patterns from the fibers 51 in the center of the annulus at the predetermined working distance to avoid a dark shadow in this portion of the light pattern. It should be understood that FIG. 5 is not intended to be to scale relative to FIG. 4 and the fiber-optic arrangement of FIG. 5 would normally be of substantially larger diameter than that of FIG. 4.

The slight diminution of uniformly illuminated area brought about by the inward angle of the fibers 51 would not be a matter of concern.

It should further be noted that merely by inverting rings 57 and 58 and rearranging fibers 51 a diverging angle for the fibers 51 may be provided in those cases in which a substantially uniformly illuminated area somewhat greater than the area of the annulus of fibers is desired. It should be noted that any diverging arrangement of fibers should be designed in accordance with the principles to be explained herein so that a dark shadow in the center of the light pattern at the desired working distance is avoided.

In particularly unusual and difficult situations it may be desirable to combine different ones of the alternative constructions shown in FIG. 4, in FIG. 5 and the diverging construction described above. For example, the arrangement of FIG. 5 could be supplemented with a smaller annulus arranged concentrically but with diverging fibers. In such an arrangement the diverging fiber annulus would enlarge the area of the light pattern while the converging fiber annulus would assure adequate illumination in the center of the pattern. It should be pointed out that a multiple-annulus arrangement is generally unnecessary and a perfectly satisfactory light pattern can be obtained with a single annulus by utilizing the principles to be described.

Figure 6:
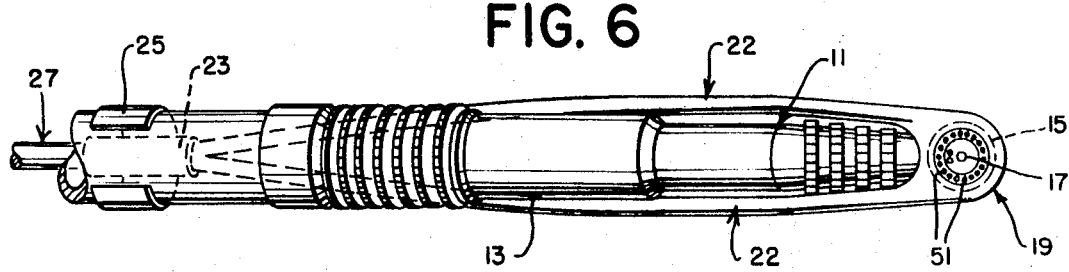
FIG. 6 is a horizontal fragmentary view of the apparatus of FIG. 2.
Figure 7:
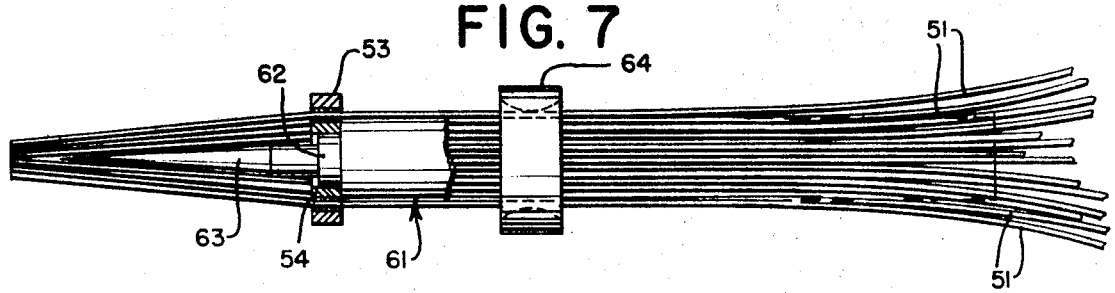
FIG. 7 is an elevational partially sectional view of a jig used in the construction of an annular illuminator according to the invention.
Figure 8:
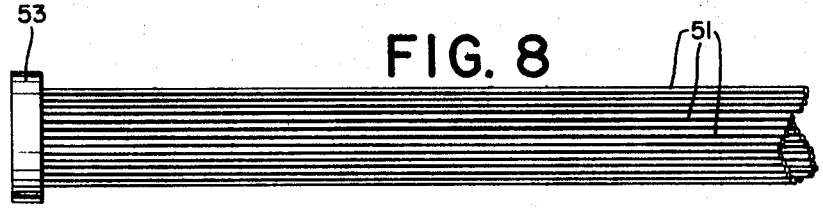
FIG. 8 is an elevational view of a partially constructed annular illuminator according to the invention.
Figure 9:
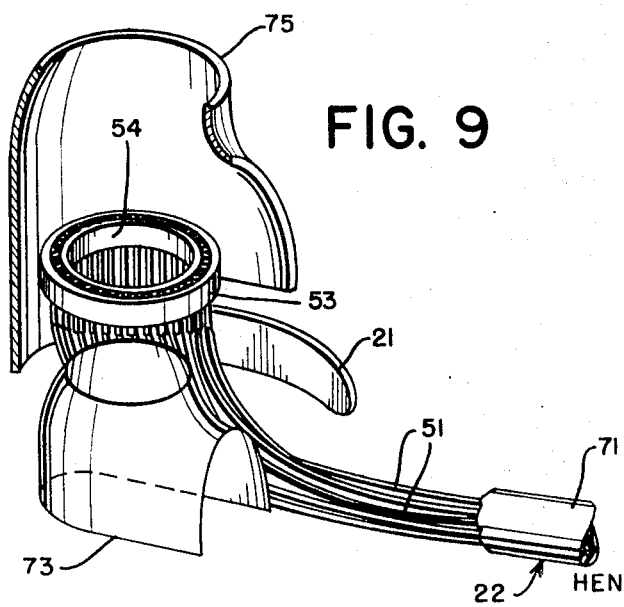
FIG. 9 is an exploded view of the apparatus of FIG. 3 partially broken away to show the construction thereof; and, FIG. 10 is a light intensity diagram useful in explaining the invention.

FIGS. 7, 8 and 9 illustrate a preferred method of manufacture for an annular illuminator according to the invention and in particular an illuminator of the form shown in plan view in FIG. 6.

Typically an illuminator according to the invention will have a bundle of optical fibers (of about 0.01-inch diameter) numbering about 100. Regardless of fiber diameter the number of fibers should not be less than 10 to insure uniform light distribution.

The steps involved in constructing an annular illuminator are in part illustrated in FIGS. 7, 8 and 9, and may be described as follows. The desired number of fibers are cut somewhat longer than required and are cemented together at one end for convenience in handling. The fibers may in some cases by glass and in other cases synthetic transparent resins. As is well known each optical fiber consists of an inner core of transparent material and an outer sheath of transparent material with the inner core having a higher refractive index than that of the outer sheath. Light is transmitted along each fiber core by successive total internal reflections at the boundary between the core and the sheath. The boundary surface in the optical fibers is not perfect and as a consequence there is a small loss associated with each total internal reflection. Largely due to losses associated with reflection, larger diameter fibers are more efficient light transmitters since there are fewer reflections involved in transmitting light through a given length of fiber.

In utilizing relatively large diameter fibers (for example 0.01 inches) to reduce transmission losses, synthetic resin optical fibers have the advantage of greater flexibility; large glass fibers fracture when bent to the required radii unless hot bending is employed. Hot bending is preferably avoided due to complications it introduces in the manufacturing process.

As shown in FIG. 7 the bundle of fibers 51 is placed on a mandrel 61. Mandrel 61 has an elongated tip 63 such that the bundle of fibers may be dropped onto the mandrel while it is in a vertical position with the cemented end of the bundle of fibers at the tip of the mandrel resulting in the arrangement of FIG. 7.

Prior to dropping the bundle of fibers on the mandrel the inner ring 54 is previously mounted on the mandrel and is preferably located by a suitably dimensioned cylinder 62.

The outside diameter of inner ring 54 is approximately the same as the major diameter of mandrel 61. In the simplest embodiment of the invention the number of fibers 51 is determined to substantially cover the periphery of the mandrel 61 and of inner ring 54 in a single layer.

A holding ring 64 may be utilized to arrange and position the fibers 51 around mandrel 61. A suitable cement such as an epoxy cement is spread on the outside of the inner ring 54 and the fibers 51 where they are in contact with this ring.

Outer ring 53 may then readily be slipped over fibers 51 and positioned in alignment with inner ring 54. The assembly of fibers 51 and rings 54 and 53 may then be placed aside to cure the adhesive either at room temperature or at slightly elevated temperatures if desired.

When the cement has cured and the assembly is secure the cemented end of the bundle of fibers 51 is cut off flush with rings 53 and 54 as shown in FIG. 8. The arrangement of FIGS. 7 and 8 is of course merely illustrative and the fibers can be more widely spaced or can be more densely arranged in a double layer as may be indicated for a particular application. Furthermore as previously suggested single layers of fibers can be arranged in plural spaces between three or more rings substantially by repeating steps of the process described above.

The assembly as illustrated in FIG. 8 is ready to be placed in the illuminator head assembly. As a first step an inner form 73 of the desired shape to fit over the dental tool or the like is provided by electroforming, stamping or drawing a suitable nickel, copper or steel alloy or by molding a suitable synthetic resin material. Inner form 73 is coated with a cement which may, for example, be an epoxy cement.

The fiber-optic annulus is aligned with the circular opening of inner form 73 and the and the fibers are arranged in the desired manner to form one or more bundles. In the illustrated case two bundles, each from one side of the form are collected. Suitable protective sleeves 71 of synthetic resin (polyvinyl chloride, polyethylene or heat-shrinkable polyolefin) are slipped over each bundle and the fibers are formed around the arch of the inner form 73.

More cement is smoothed over the fibers and an outer form 75 is pressed into place. The outer form 75 may be formed in substantially the same manner as inner form 73 and is shaped to form the protective cover for the assembly consisting of inner form 73, fibers 51, and outer and inner rings 53 and 54. Retaining clip 21 or its equivalent may be formed as a part of outer form 75 or may be separately secured in position.

Upon curing of the adhesive the assembly of the annular illuminator head is substantially complete. In most cases it will be desired to optically grind the severed ends of fibers 51 and this may better be accomplished after the assembly illustrated in FIG. 8 has been incorporated in the assembled illuminator head. The pair of fiber bundles 22 is merged into a single fiber bundle by conventional fiber optical techniques at a convenient distance from the annular illuminator head (for example 6—9 inches).

It should be pointed out that any fiber optical bundle couplings between the light source and the head 19 should be arranged so that all fibers in the bundle furthest from the light source are fully illuminated. This may be arranged for example by having the diameter of the main fiber bundle which leads to the light source slightly larger than the fiber bundle leading to the illuminator head. Although this causes slight optical energy loss, it guarantees that every fiber in the annulus is illuminated, thereby insuring uniform light distribution at the annulus. Alternatively, couplers such as coupler 29 in the light-transmitting bundle may be provided with suitable optics to insure that all fibers are illuminated in the terminal portion of the fiber optical light transmitter. The complete annular illuminator head is shown in FIGS. 1 through 3. As previously mentioned it will generally be desirable to grind and optically polish both ends of the optical fiber bundle. This may most conveniently be done when the assembly of the device has been completed and all cemented portions have fully cured. If desired, the ends of the optical fibers, particularly in the case of synthetic resin fibers, may be protected against chemical and physical hazards by a thin coating of clear epoxy cement.

In accordance with the present invention the annular configuration of the optical fibers is exploited to the maximum by proper determination of the dimensions of the annulus relative to the characteristics of the fibers and the working distance at which uniform shadow-free illumination is desired.

Figure 10:
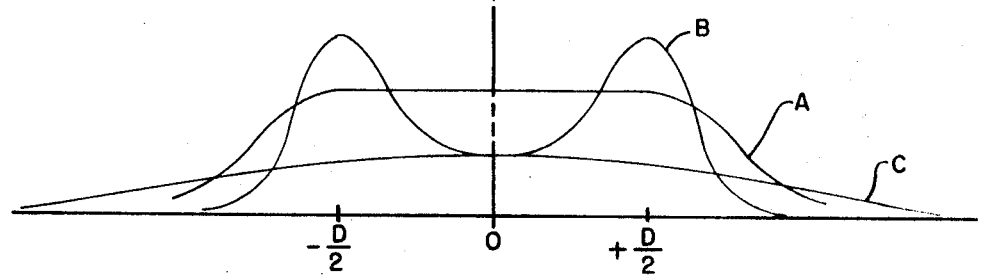

An explanation of the important design factors for achieving efficient and effective illumination of a predetermined work area will be aided by reference to FIG. 10. The abscissa in FIG. 10 represents lateral distance relative to the axis of the optical fiber annulus on a reference plane representing the working surface. The ordinate represents light intensity in arbitrary units.

Using the simple example of a parallel fiber configuration with annulus mean diameter D such as shown in FIG. 4, the points directly under individual fibers are labeled $+D/2$ and $-D/2$.

The curve labeled A in FIG. 10 represents the approximate light distribution of an annular illuminator properly designed according to the principles of the present invention. Such a distribution is not invariably achieved without proper consideration to the design. Noting the curve labeled B it will be seen that excess illumination may be present directly under the individual optical fibers and inadequate illumination may be provided at the important central area of the working surface where the output beam from the individual fibers has too narrow a cone for the annulus diameter and working distance for which it is employed.

Also from FIG. 10 it may be seen, as illustrated in the curve labeled C, that where the individual fibers provide a beam having too wide a cone of illumination a substantial amount of the illuminating power is wasted on the fringes of the pattern and the light intensity in the central working area thereby suffers. This is, generally, less objectionable than having strongly nonuniform illumination as in the paragraph above.

This problem will first be discussed in terms of the proper diameter of annulus for a given optical fiber output beam characteristic and a predetermined working distance. Thereafter a discussion will be provided for the cases where it is impossible or inconvenient to obtain fibers with suitable output beam characteristics to fit the constraints of a particular situation in terms of annulus diameter and desired working distance.

It should be noted that the characteristics of the optical fibers are not the sole determining factor in the light distribution of the output beam from the fiber. For example, the degree of collimation and the direction of the light beam injected into the input end of the fiber-optic light transmitter can affect the light distribution in output beam. Even the number and radii of bends in the fiber-optic bundle could change the output light pattern in some instances. In all of the following discussions it is assumed that the light projected on the input end of the fiber-optic bundle is suitably convergent and nominally fills the acceptance cone (and that the fiber-optic light transmitter will have a number of bends of moderate radius). As a practical matter it is possible to arrive at good practical annular illuminator configurations utilizing different numbers, types and/or sizes of optical fibers by assuming these essentially average conditions for subsidiary factors affecting the light distribution.

The output beam from a single optical fiber will have its highest intensity along the axis of such fiber and the intensity will drop off rather rapidly as one departs laterally from the optical axis. In the design of an annular illuminator according to the invention one seeks to illuminate a working surface spaced from the illuminator no less than a minimum distance essentially controlled by the tool for which the illuminator is adapted to be used. The minimum working distance will be designated throughout by S.

An approximately flat light intensity distribution can be conveniently defined as that which provides at the work surface a light intensity on the projected axis of the illuminator annulus which is approximately equal to the light intensity on the projected axis of each individual optical fiber.

The problem of achieving such a light intensity distribution at the working distance S may be approached by analytical methods, graphical methods, or a combination of both and by the use of certain approximations a practical rule of thumb design technique may be formulated.

It will first be noted that (referring to FIG. 4) the optimum ratio of S to D will remain substantially constant for a given size and type of optical fiber. This is intuitively expected since the dimensions of the optical fibers are small compared with other dimensions. A basic parameter of the problem is the angle subtended by the annulus from the center of the surface at the distance S. The tangent of half this angle is ½(D/S).

Observing this relationship, one is permitted to essentially scale the dimensions of one annular illuminator from another which uses the same size and type of fiber. It will generally be desirable to increase or decrease the number of optical fibers so as to just fill the annulus perimeter.

It has further been determined that a practical approximation to the optimum ratio for ½(D/S) (or the tangent of the subtended half angle) can be derived directly from the characteristics for a single optical fiber of the type involved. Considering a single optical fiber at a distance S from a working surface perpendicular to the fiber axis it has previously been noted that the maximum intensity on such surface will coincide with the extended axis of the fiber. As one considers points laterally displaced from this intersection the intensity of light from the single optical fiber will diminish. At such point as the intensity diminishes to one-third this lateral departure may be taken as a good working approximation to the optimum value for one-half D.

The necessary data for a particular optical fiber intensity distribution pattern may be obtained by direct measurement or obtained at least approximately from published data on the optical fibers. To summarize the foregoing explanation one can for a rule of thumb state that the radius for the annulus of the illuminator may be determined to be such that the intensity due to a single optical fiber at the center of the working surface is one-third the intensity on the working surface directly under the single optic fiber.

Considering now the situations where suitable optical fibers are not available with a light intensity distribution pattern proper for a given application, it will, in general, be found that the light distribution pattern is narrower than desired. In such case a diffuser such as shown at 55 in FIG. 4 may be utilized to broaden the light distribution pattern of the individual fibers so that they will satisfy the design considerations described above.

Another different technique for utilizing optical fibers with a narrower than optimum light distribution pattern is illustrated in FIG. 5. In FIG. 5 it will be seen that the fibers are slanted inwardly so that they will illuminate more intensely the center of the working area which would otherwise be inadequately illuminated. A fair approximation to the degree of slope required for the fibers 51 in an arrangement such as shown in FIG. 5 can be arrived at as follows. Obviously some smaller diameter for an annulus of parallel fibers would fulfill the design considerations explained hereinabove. If the fibers 51 are sloped toward the center of the annulus so that the projection of the axes of the fibers intercepts the working surface to define a circle of the smaller diameter of parallel fibers called for by the above-described considerations, uniform illumination of the work area will substantially be achieved. In the arrangement of FIG. 5 it will be noted that a smaller area of uniform illumination is provided with a higher intensity than if the technique of FIG. 4 is applied.

It should be noted that the technique illustrated in FIG. 5 may also be applied to the situation where circumstances prevent using an annulus as large as desired. In such case the optical fibers would be sloped outwardly rather than inwardly and the light pattern of the annulus of dimension which would have been called for by design considerations may be approximated by causing the projection of the axes of the individual fibers to intercept the work surface in a circle of such diameter.

The invention has been described as applied to an illuminator for use with a dental tool, and in particular, an air-driven dental tool. Obviously, the illuminator can also be adapted to cooperate with other dental tools mechanically driven or otherwise driven and with various powered or unpowered tools in general.

Adaptations of the illuminator may be made simply by conforming its shape to the chuck or toolholder portion of the apparatus with which it is to be used. It should further be noted that rather than being an adjunct of the tool the illuminator according to the present invention may be built into the tool with a space provided in the interior of the handle for passage of the optical fibers from the working end of the tool to the rear of the handle of the tool. Leading the optical fibers along the handle of the tool in a pair of bundles has been found to be especially convenient and provide minimal interference with normal operation of the tool. However, this configuration is by no means the only one contemplated and the fibers may be carried along the tool handle in a single bundle, in more than two bundles or in a flat configuration essentially sheathing the handle.

As examples of annular illuminators with dimensions particularly effective for carrying out the present invention the following combinations of dimensions have been constructed and evaluated. Ninety-eight (98) synthetic resin fibers (0.01-inch-diameter Du Pont Crofon light-guide fibers) arranged in an annulus of 0.310 inch mean diameter provide substantially uniform illumination in a work area spaced 0.4 inches from the illuminator. One hundred and eleven (111) of the same fibers in an annulus of 0.33 inches provided uniform intensity on a work area spaced therefrom by 0.44 inches. As regards illuminators of the type illustrated in FIG. 5 wherein the fibers lie at an inclined angle to the axis of the illuminators, ninety-eight (98) fibers of the above-described type with angle 2Φ equal to 11° and annulus diameter of 0.310 inches provides a device for which the separation distance for uniform distribution is 0.313 inches.

In addition to the variations and modifications to the invention shown and suggested herein other modifications and variations within the scope of the invention will be obvious to those skilled in the art and accordingly the invention is not to be construed to be limited to those variations and modifications shown or suggested, but is to be defined by reference to the appended claims.

What I claim is:

1. An annular illuminator for a movable tool which includes a first work-contacting portion and a second portion, said illuminator comprising an annular support structure adapted to be mounted to said second portion and surrounding said first portion, at least 10 optically transmitting fibers with their ends secured in said support structure and distributed around said structure and directed in the direction of a workpiece, said fibers being gathered into at least one bundle by a transitional enclosing structure, means for securing said bundle to pass along the length of said tool second portion, and means for optically coupling the opposite ends of said fibers to an intense light source 2. Apparatus as claimed in claim 1 wherein the first said fiber ends are substantially evenly distributed on at least a portion of a circle approximately centered on said work-contacting tool portion.

3. Apparatus as claimed in claim 2 wherein the fibers from respective halves of said circle are gathered into two bundles extending the length of said tool second portion and said two bundles are joined into a single bundle in advance of the point of coupling to said intense light source.

4. Apparatus as claimed in claim 2 wherein the first said fiber ends are inwardly inclined.

5. Apparatus as claimed in claim 2 further including a diffuser secured to said support structure for diffusing light from said fiber ends.

6. An annular illuminator for a hand-held tool which includes a first work-contacting portion and a second handle portion, said illuminator comprising an annular support structure adapted to be mounted to said second portion and surrounding said first portion, at least 10 optically transmitting fibers with their ends secured in said support structure and distributed in a circle around said structure and directed in the direction of a workpiece, said fibers being gathered into at least one protectively covered bundle by a transitional enclosing structure, means for securing said bundle to pass along the length of said tool second portion, an intense light source and means for optically coupling the other ends of said fibers to said intense light source.

7. A work area illuminating dental handpiece comprising a handle portion, a chuck portion, a work-contacting portion mounted in said chuck portion, means for securing optical fibers around said chuck portion, at least 10 optically transmitting fibers secured by said means with their ends and distributed around said chuck and directed in the direction of the end of said work-contacting portion, said fibers being gathered into at least one protectively covered bundle by a transitional enclosing structure, means for securing said bundle to pass along the length of said handle portion, an intense light source and an additional length of flexible fiber-optic light transmitter coupling, said fibers to said intense light source.

8. Apparatus as claimed in claim 7 wherein said fiber ends at least in part are substantially evenly distributed on at least a portion of a circle approximately centered on said work-contacting tool portion.

9. An annular illuminator for a movable tool which includes a first work-contacting portion and a second portion, said illuminator comprising an annular support structure adapted to be mounted to said second portion and surrounding said first portion, at least 10 optically transmitting fibers with their ends secured in said support structure and substantially evenly distributed around said structure on at least a portion of a circle approximately centered on said work-contacting tool portion and directed in the direction of a workpiece, said fibers having at their output ends an angular relation with the axis of said work-contacting portion to cause the light on a surface at a predetermined minimum working distance determined by said work-contacting portion to be approximately of equal intensity at the projected axis of the center of said circle of fibers to that at the projected axis of the individual fibers along said circle, said fibers being gathered into at least one bundle by a transitional enclosing structure, means for securing said bundle to pass along the length of said tool second portion, and means for optically coupling the opposite ends of said fibers to an intense light source.

10. A work area illuminating dental handpiece comprising a handle portion, a chuck portion, a work-contacting portion mounted in said chuck portion, means for securing optical fibers around said chuck portion, at least 10 optically transmitting fibers secured by said means with their ends substantially evenly distributed around said chuck on at least a portion of a circle approximately centered on said work-contacting tool portion and directed in the direction of the end of said work-contacting portion, said fibers having at their output ends an angular relation with the axis of said work-contacting portion to cause the light on a surface at a predetermined minimum working distance determined by said work-contacting portion to be approximately of equal intensity at the projected axis of the center of said circle to that at the projected axis of the individual fibers along said circle, said fibers being gathered into at least one protectively covered bundle by a transitional enclosing structure, means for securing said bundle to pass along the length of said handle portion, an intense light source and an additional length of flexible fiber-optic light transmitter coupling said fibers to said intense light source.